T. F. MILLER.
WIRE WORKING MACHINE.
APPLICATION FILED MAY 25, 1916.

1,235,832.

Patented Aug. 7, 1917.
6 SHEETS—SHEET 3.

THOMAS F. MILLER

By Marion & Marion
Attys.

T. F. MILLER.
WIRE WORKING MACHINE.
APPLICATION FILED MAY 25, 1916.

1,235,832.

Patented Aug. 7, 1917.
6 SHEETS—SHEET 5.

THOMAS F. MILLER
INVENTOR

By
Marion Pharm
Attorneys

T. F. MILLER.
WIRE WORKING MACHINE.
APPLICATION FILED MAY 25, 1916.

1,235,832.

Patented Aug. 7, 1917.
6 SHEETS—SHEET 6.

THOMAS F. MILLER.
INVENTOR.

By Marion & Marion
Attys

UNITED STATES PATENT OFFICE.

THOMAS FREDERICK MILLER, OF ST. JOHN, NEW BRUNSWICK, CANADA, ASSIGNOR OF ONE-HALF TO WILLIAM J. HAMILTON, OF ST. JOHN, NEW BRUNSWICK, CANADA.

WIRE-WORKING MACHINE.

1,235,832.  Specification of Letters Patent.  Patented Aug. 7, 1917.

Application filed May 25, 1916.  Serial No. 99,737.

*To all whom it may concern:*

Be it known that I, THOMAS FREDERICK MILLER, a subject of the King of Great Britain, residing at St. John, Province of New Brunswick, Canada, have invented certain new and useful Improvements in Wire-Working Machines; and I do hereby declare that the following is a full, clear, and exact description of the invention, such as will enable others skilled in the art to which it appertains to make and use the same.

The present invention relates to a wire working machine and more particularly to a machine for forming loops or eyes at the ends of wires preparatory to using the same for binding and tying bales of articles together.

An object of the present invention is to provide a machine of this character wherein loops may be formed upon the ends of wires in a quick and economical way through the continuous operation of the machine.

A further object of the invention is to provide a strong, durable and efficient machine of this character which will be comparatively inexpensive in the cost of manufacture thereby rendering the machine commercially desirable.

With the above and other objects in view which will hereinafter appear as the description continues, the invention consists of the novel features of construction and the formation of parts as will be hereinafter more fully described and particularly pointed out in the appended claims.

In the accompanying drawings is shown the simple and preferred form of the invention, it being, however, understood that no limitation is necessarily made to the precise structural details herein exhibited but the right is hereby reserved to any changes or alterations that may be had and come within the scope of the invention without departing from the spirit thereof or sacrificing the efficiency of the same.

In the accompanying drawings.

Referring now more particularly to the accompanying drawings wherein like and corresponding parts are designated by similar reference characters throughout the several views.

The device forming the subject-matter of the present invention comprises a machine wherein strips of wire are manually fed to the machine and there retained in place, wherein other mechanisms of the machine are brought into play for bending one end of each of said strips of wire and the bent ends of the wires are twisted upon themselves to form loops or eyes, whereby the opposite ends of the wires may engage said loops for tying the ends of the wires together when the same are to be used for binding bales or articles together.

The machine has arranged thereupon a support or plate which contains the strands of wires, and this plate is to be oscillated so that when it is moved in one direction a strand of wire may be placed at the side of the table, where it will be gripped and held in a stationary position. As the strand of wire is held in this stationary position, a forming block is brought into operation whereby it will bend one end of the wire upon itself. This bent portion of the wire extends over a projecting lug and the latter is carried by a revolving shaft, so that by the turning of said shaft the bent end of this wire will be caused to move therewith, and in so rotating with said shaft the bent portion of the wire will twist itself upon the body portion of the wire, thereby drawing itself in place and forming a loop. After this loop or eye has been formed the gripping blocks are released and the finished wire is caused to pass through the table and fall within a tray or other suitable receptacle arranged beneath the table. When this operation has been completed at one side of the oscillating plate, the latter is caused to move in an opposite direction whereby another strand of wire will be gripped and retained at the opposite side of this plate, and a similar mechanism will be brought into use for bending, twisting and looping one end of this strand of wire. During the continual operation of the machine the wires are fed to each side of the oscillating plate where they will be gripped, bent, twisted, looped and subsequently be deposited below the machine automatically and continuously.

The numeral 1 indicates a table which is supported upon the legs 2 and the latter are to be rigidly secured to a floor or other support to hold the table stationary. Journaled within bearing blocks 3 supported upon the rounds of the table is a longitudinally extending shaft 4 having keyed to one end thereof a driving pulley 5 which may be connected to any suitable source of power for rotating the shaft 4. Journaled within the bearings 6 suspended from the table 1 by means of the arms 7 is a longitudinally extending shaft 8 which is supported in a plane higher than the shaft 4 and to the rear side of the center of the table. Keyed to one end of the shaft 8 is a gear 9 adapted to mesh with a gear 10 carried by the shaft 4 whereby upon the continuous rotation of the shaft 4 the shaft 8 will also be continuously rotated but at a lower rate of speed due to the gear connections 9 and 10. Arranged upon the center of the table 1 is an oscillating plate 11 which extends transversely of the table and is fulcrumed or pivoted thereto by means of the shaft 12. The upper end of the shaft 12 is connected by means of a bar 13 to a vertically extending oscillating shaft 14 which extends through the medial portion of the oscillating plate 11 depending through a slot 15 formed within the table 1 and having its lower end adapted to travel within a slot 16 formed within a cam 17 which is keyed upon the medial portion of the shaft 8. The oscillating plate 11 is adapted to turn upon its pivot connection 12 by means of the cam slot 16 when the cam is rotated for the purpose which will hereinafter be described.

Also keyed to the adjacent ends of the shaft 8 are duplicate mutilated gears 18. Journaled within bearings 19 and 20 arranged upon the top of the table 1 are shafts 21 each carrying a mutilated gear 22 which gears are adapted to mesh with the gears 18 on the shaft 8. Carried by the inner ends of each of the shafts 21 are forming or looping blocks 23 which are keyed to the shafts 21 by means of the stud bolts 24, and the purpose of these forming blocks will also be later described. Secured to the rear end of the table 1 by means of the arms 25 are depending brackets 26 upon which are mounted journal boxes 27 having journaled therein a transversely extending shaft 28. Keyed to the inner end of the shaft 28 is a bevel gear 29 adapted to mesh with the bevel gear 30 carried by the shaft 8. Also keyed upon the shaft 28 is a mutilated gear 31 adapted to mesh with the mutilated gear 32. Mounted upon the arms 25 are bearing blocks 33 in which is journaled a shaft 34 having keyed thereto the mutilated gear 32 and the inner end of this shaft 34 has keyed thereto a gear 35. On each side of the rear ends of the oscillating plate 11 are arranged bearing blocks 36 in which are journaled stud shafts 37 and 38 having the gears 39 and 40 keyed to their respective inner ends. These gears 39 and 40 are adapted to intermittently mesh with the gear 35 so that the shafts 37 and 38 will be rotated at intervals. Extending from each of the gears 39 and 40 are flanges 41 having recesses 42 in the periphery thereof. Adjustably mounted within the arms 25 are stop pins 43 which are adapted to rest within the recesses 42 so as to hold one of the shafts 38 against rotation while the opposite shaft 37 is being rotated. The opposite ends of the shafts 37 and 38 are cut away and have projecting from the flat faces thereof the lug projections 44. To the opposite sides of the oscillating plate 11 and adjacent their forward ends are provided vertically extending gripping blocks 45.

Mounted upon the table 1 are gripping blocks 46 in which are mounted spring-actuated piston rods 47 each having a gripping piston 48 secured to the inner end thereof. Arranged within the recesses formed within the blocks 46 are coiled springs 49 having their outer ends adapted to rest against pins 50 carried by the rods 47 whereby the gripping pistons 48 will be normally held within the recesses 51 formed within the gripping blocks 46. Secured to the inner face of each of the gears 22 are cams 52, which are adapted to contact with the outer ends of the rods 47 whereby the rods will be forced inwardly against the tension of the springs 49 and the gripping pistons forced outwardly against the gripping blocks 45 whereby the wires A will be gripped and held in a stationary position.

Figure 2:
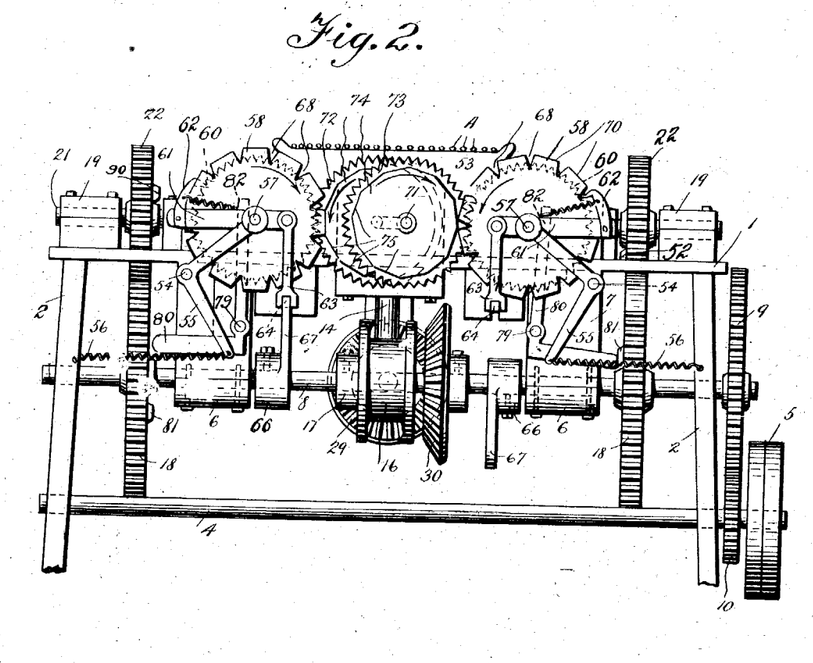
Fig. 2 is a front elevation of the same.
Figures 16, 17, 18, 21:
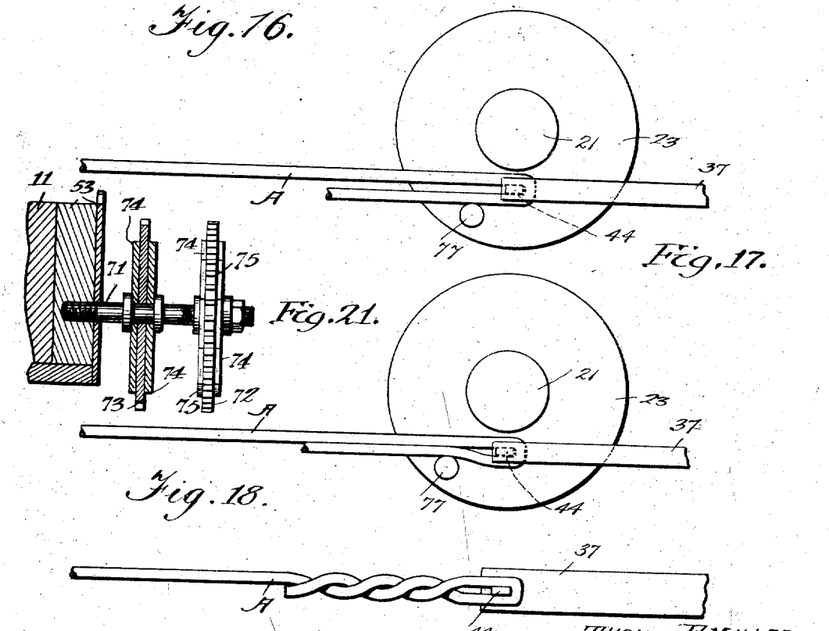
Fig. 21 is a detail vertical section taken on the line 21—21 of Fig. 1.

A tray 53, as is better illustrated in Figs. 2 and 21, is mounted upon the table in front of the oscillating plate 11, upon which rest the forward or outer ends of the wires A.

Pivotally mounted as at 54 upon the table 1 are crank arms 55 each having one end thereof connected to the legs 2 by means of the coiled springs 56. Within the opposite ends of these bell-crank levers 55 are journaled shafts 57 upon each of which are rotatably mounted a pair of disks 58 and 59 between which and connected thereto are disks 60 having teeth arranged in the periphery thereof. Also pivotally mounted upon the shafts 57 are levers 61 each having a pawl 62 pivotally connected to one end thereof adapted to intermittently engage the teeth of the disks 60, and the opposite ends of these levers 61 have pivotally connected thereto depending arms 63. Connected to the lower ends of the depending arms 63 and extending transversely of the table are levers 64 having their opposite ends connected to the table by means of the coiled springs 65. These coiled springs normally tend to hold the arms 63 in a raised position thereby holding the spring-actuated pawls 62 normally out of engagement with the teeth arranged within the periphery of the disk 60. Keyed upon the shaft 8 are sleeves 66 each having arranged thereon a cam 67 which cams are diametrically oppositely arranged with respect to each other and which are adapted to engage the levers 64 whereby the latter will be operated against the tension of the springs 65 and the pawl 62 caused to engage the teeth of the disk 60 whereby said disk will be moved a short distance upon its axis thereby also causing the plates 58 and 59 to be carried therewith. The diameters of the plates 58 and 59 are greater than that of the disk 60 and the peripheries of these plates are notched as at 68 and these notches are arranged in the plates so as to lie in alinement with each other. The extreme outer peripheries of these plates are provided with the flat surfaces 70 arranged between the notches 68. Secured within the forward end of the table 1 and the tray 53 is a shaft 71 having journaled thereon a disk 72 provided with peripheral teeth adapted to engage the teeth of the left-hand disk 60 and also journaled upon the shaft 71 is a similar disk 73 having peripheral teeth adapted to engage the teeth of the right-hand disk 60 whereby upon the rotation of the disks 60 the disks 72 and 73 will also be rotated. Secured to the opposite faces of the disks 72 and 73 are plates 74 having peripheral flat faces 75 adapted to register with the flat surfaces 70 of the disks 58 and 59 whereby when the pawl 62 is released from the teeth on the disk 60 the flat surfaces 70 and 75 will be brought into contact thereby preventing the rotation of the disks 60, 72 and 73, but when the cam 67 is brought into contact with the lever 64 and the pawl 62 brought into operation these flat surfaces will be released as the shaft 57 upon which the disk 60 is mounted is free to move when the resistance offered by the spring 56 has been released.

Figures 1, 19, 20:
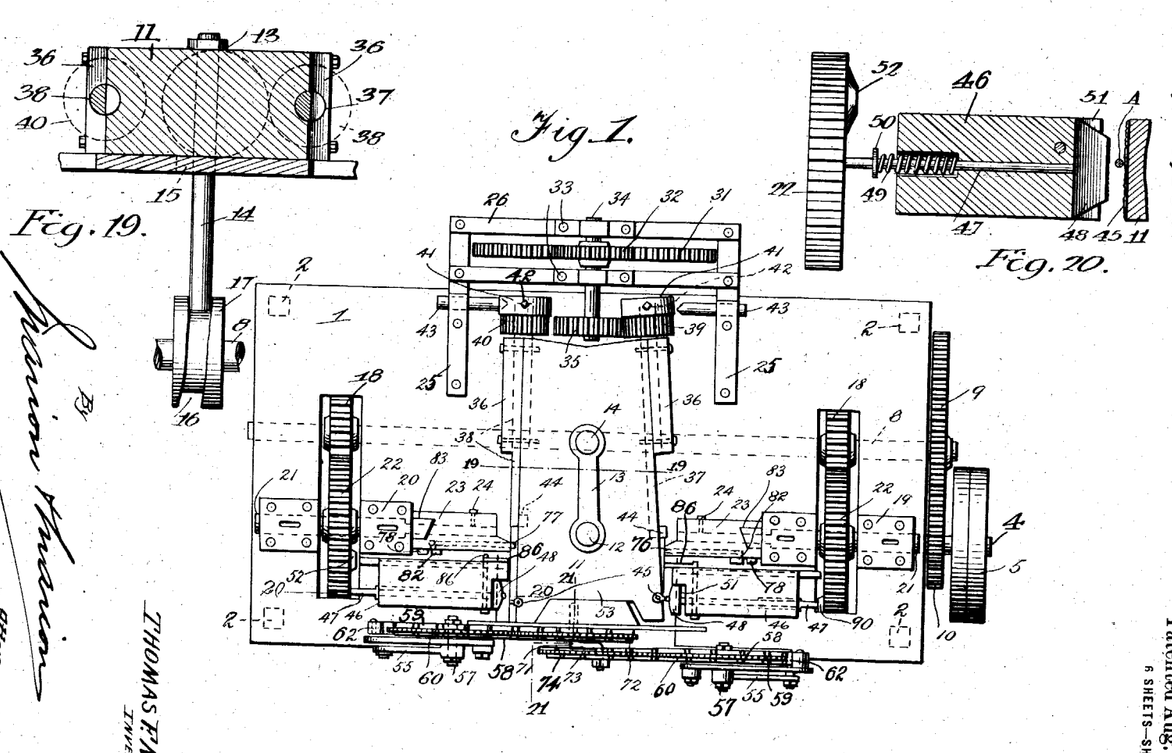
Figure 1 is a plan view embodying the invention.
Fig. 19 is a detail vertical section taken on the line 19—19 of Fig. 1.
Fig. 20 is a detail section taken on the line 20—20 of Fig. 1.

The wires A are manually moved from each side of the plate 11 and the tray 53 until the outer or forward ends of one of the wires rest within the alining notches 68 formed within the plates 58 and 59. Upon the rotation of these plates 58 and 59 in the direction of the arrows as shown, the wires will be carried by the plates so as to bring the same between the gripping blocks 45 and 48 as shown in Fig. 20, and then the gripping blocks are brought into operation for firmly gripping the wire and retaining the same in place so that the forming blocks may be brought into operation and the inner ends of the wires bent and twisted to form the loops.

Slidably mounted within each of the forming blocks 23 and adapted to protrude beyond the lug extensions 76 are the forming lugs 77. These forming lugs 77 are L-shaped in configuration and have a protruding arm 78 which is adapted to slide within a slot formed within the forming blocks 23. Pivotally mounted as at 79 upon each of the depending supports 7 is a bell-crank lever 80 which is adapted to extend within the travel of a lug 81 formed upon the inner face of each of the gear wheels 18. The vertical arm 82 is adapted to engage the protruding arm 78 of the forming lug whereby the said forming lug will be forced back into the forming block 23. Plates 83 are secured to the bearing blocks 20 and have projecting therefrom cam projecting ends 84 which are adapted to extend within the travel of the arms 78 so that when said arms strike said cams the forming lugs 77 will be forced outwardly and when so forced to this outward position they will each remain at such position until the cam 81 lifts the bell-crank lever 80 and causes the arm 82 to strike the arm 78 so as to force the forming lug 77 back within the forming block 23.

Figure 15:
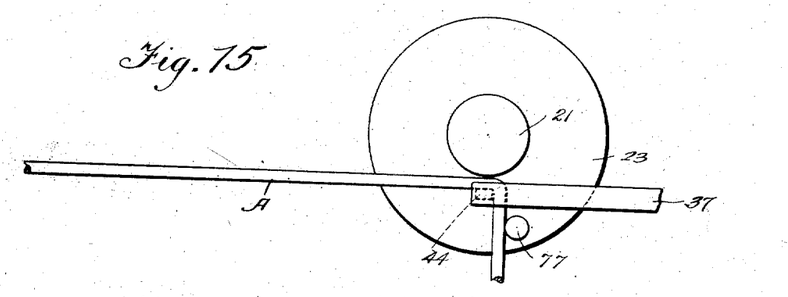
Figs. 15 to 18 inclusive are diagrammatic views illustrating the manner in which the wire is looped and coiled upon itself.

When one strand of wire has been fed between the gripping blocks 45 and 48, the plate 11 is oscillated by means of the cam 16 whereby the gripping block 45 is moved toward the gripping block 48 and the cam projection 52 forces the gripping block 48 toward the gripping block 45, thereby securely holding the wire in position. As this plate 11 is oscillated so as to assume the position as shown in Fig. 1, the gears 35 and 39 are brought into mesh so as to cause the shaft 37 to rotate. The shaft 37 is rotated until the lug 44 carried thereby is presented in the position as shown in Fig. 1. At the same time the forming block 23 is caused to revolve as before described and the forming lug 77 forced outwardly until it protrudes within the path of the wire, so as to strike against the inner end thereof and bend the same around the lug 44, as better illustrated in Figs. 15 to 17 of the drawings. This bending operation is formed within less time than it takes for one revolution of the shaft 37, but as the shaft 37 is still being caused to revolve it will carry the inner bent end of the wire therewith as the wire has been looped around the lug 44, until the inner end of the wire has twisted itself upon the body portion of the wire as shown in Fig. 18 of the drawings, to form the loop at this end of the wire. When the forming lug 77 is in the position as shown in Fig. 17 of the drawings, the bell-crank lever 80 will come in contact with the revolving lug 81 whereby said bell-crank lever will force the forming lug 77 back within the forming block 23 so that this lug 77 may pass around the looped end of the wire upon the continuous rotation of the forming block without coming in contact therewith.

Adapted to be journaled within the gripping block 46 is a shaft 85 carrying at one end thereof an arm 86. Also keyed upon the shaft 85 is a gear 87 which is adapted to mesh with a reciprocating rack 88 journaled within the block 46, and the inner end of this rack 88 projects beyond the block 46 as at 89. Carried by the inner face of each of the gears 22 is a cam 90 which is adapted to engage the end 89 of the rack-bar for forcing the same inwardly against the tension of the coiled spring 91 and by so moving the rack-bar 88 the gear 87 will be rotated thereby rotating the arm 86. After the loop has been formed upon the end of the wire the cam 67 will again operate the lever 64 which in turn will rotate the plates 58 and 59 through the pawl 62 as hereinbefore described thereby releasing the wire on which a loop has just been formed and bringing another wire into position to have a loop formed thereupon and as the wire is released from the gripping members and a loop formed thereupon the arm 86 strikes against the finished wire thereby forcing the same from the notches 68 within the disks 58 and 59, and permitting the finished product to fall upon the floor or a tray arranged beneath the machine.

Whereas the looping operation of the machine has hereinbefore been described as being performed at the right-hand side of the oscillating plate, it is of course to be understood that when the plate 11 is oscillated in an opposite direction the same operation will be effected at the opposite side of the oscillating plate and in this manner the operator can continuously be feeding the wires to each side of the oscillating plate 11 with both hands and the loops are formed upon the ends of the wires in a quick and efficient manner.

Figure 4:
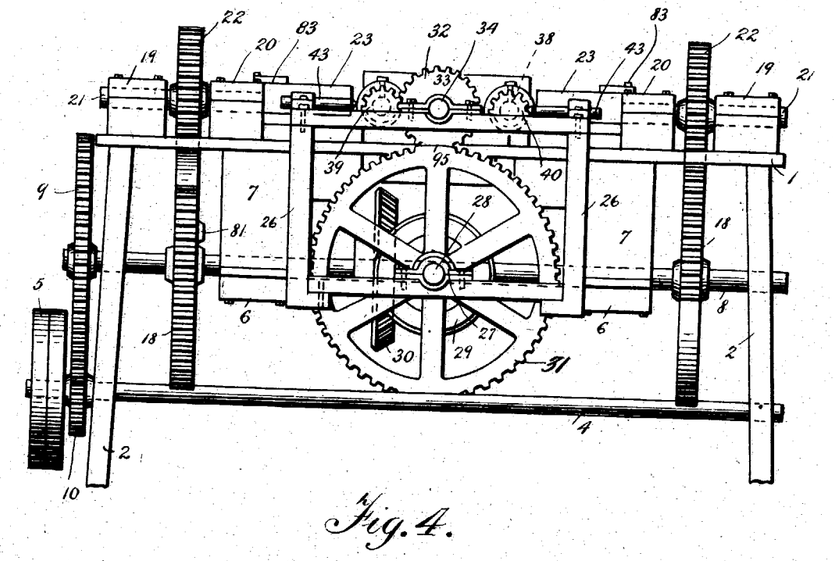
Fig. 4 is a rear elevation of the machine.
Figures 5, 6, 7, 8, 9:
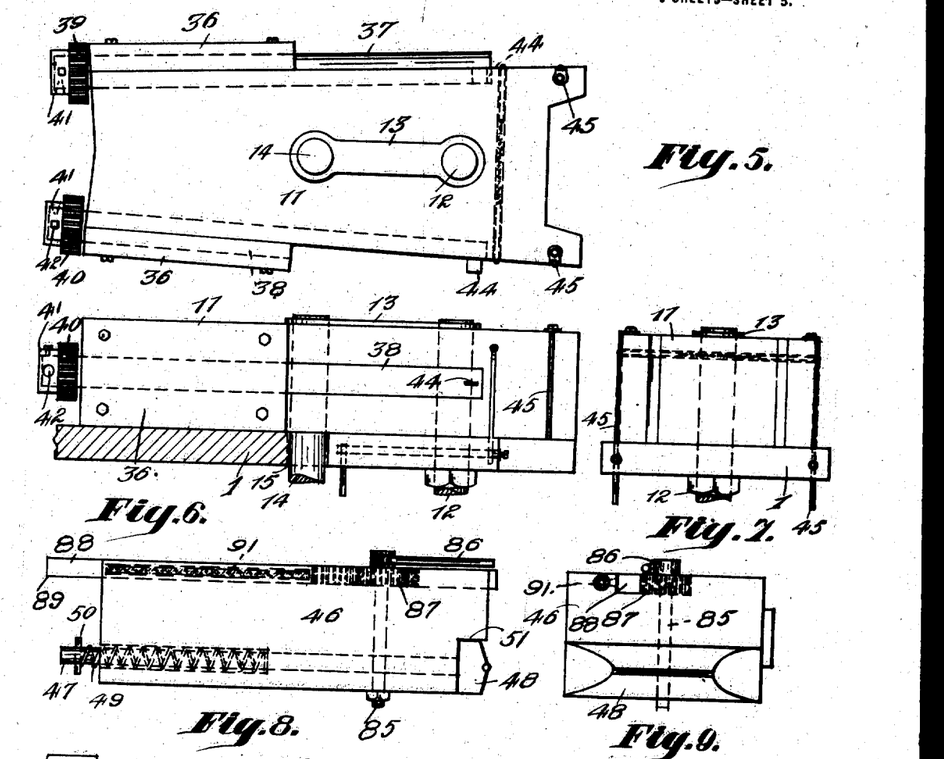
Fig. 5 is a detail plan view of the oscillating block.
Fig. 6 is a side elevation of the same as applied to the supporting table.
Fig. 7 is a front elevation of the same.
Fig. 8 is a top plan view of the gripping block.
Fig. 9 is an end elevation of the same.
Figure 10:
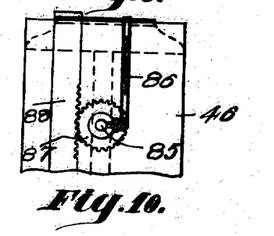
Fig. 10 is a detail side elevation of the gripping block.
Figure 11:
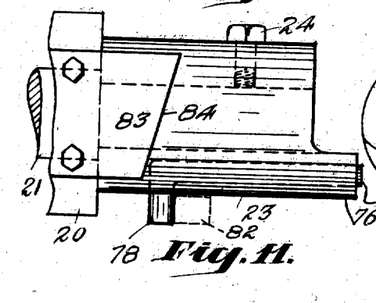
Fig. 11 is a detail plan view of the forming block.
Figure 12:
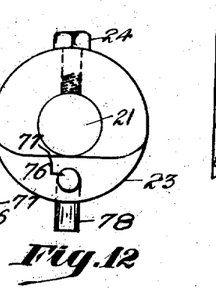
Fig. 12 is a front elevation of the same.
Figure 13:
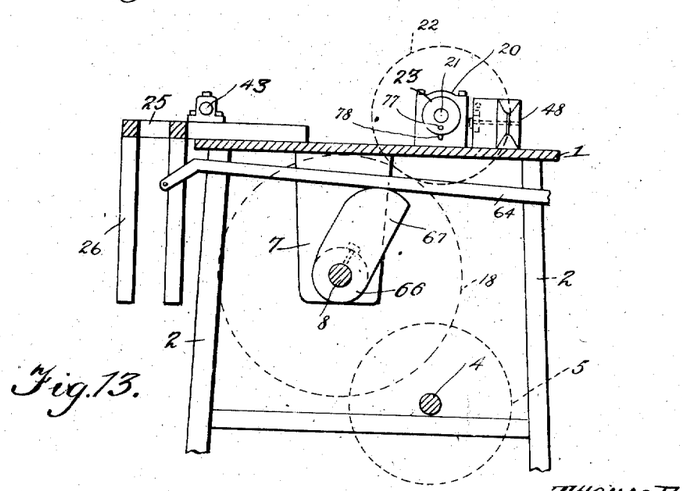
Fig. 13 is a fragmental vertical cross-section view.
Figure 14:
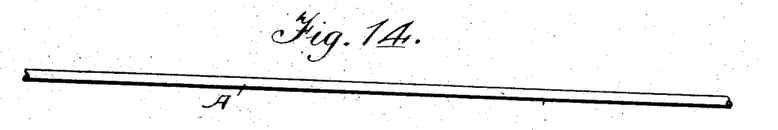
Fig. 14 is a plan view of a strand of wire to be looped.

By having particular reference to Fig. 4 of the drawings it will be noted that the gears 31 and 32 are mutilated gears having the flattened portions in their peripheries as indicated by the numeral 95 whereby upon the continuous rotation of the gear 31 the gear 32 will at intervals be held against rotation giving time at the proper interval for the gear 35 to change its mesh with either the gear 39 or 40 and the mutilated gears at this interval act as a releasing mechanism so that the gears 35, 39 and 40 may mesh at intervals without stripping their gear teeth.

Figure 3:
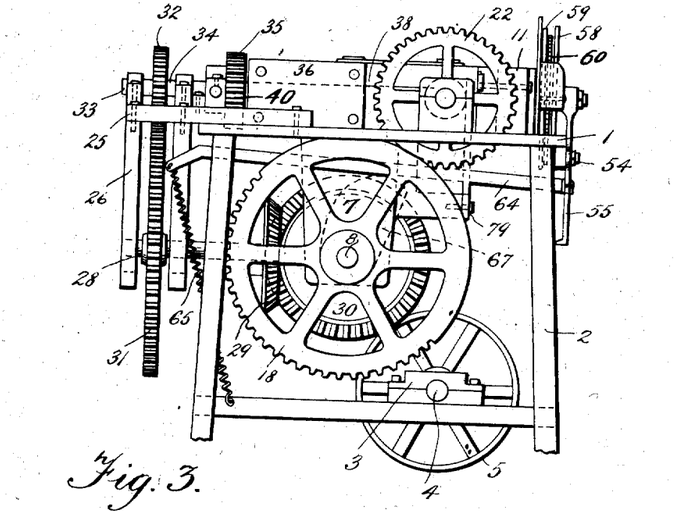
Fig. 3 is a side elevation of the machine having the end driving gears removed for the sake of better showing the more important features of the invention.

It will also be noted from Figs. 2 and 3 of the drawings that the meshing gears 18 and 22 are also mutilated gears whereby the gear 18 may be continuously rotated but the shaft 21 will for a short period be held against rotation after the loop-forming mechanism has performed its work upon each wire but at intervals the gear 18 will mesh with the gear 22 for bringing the forming mechanism into operation.

During the operation of the machine power is continually supplied to the shaft 4 through the pulley 5 and the shaft 8 is caused to be revolved continuously but at a slower rate of speed than the shaft 4. When the oscillating plate 11 has been swung upon its pivot connection 12 in the position as shown in Fig. 1 the continuously driven pinion 35 will engage the pinion 39 for revolving the shaft 37 and the shaft 38 is held stationary and against rotation by means of the pin 43 at the left-hand side of the machine. A strand of wire is then passed at the right-hand side of the plate 11 where it will be gripped between the gripping blocks 45 and 48, and one end of this strand of wire will rest within one set of notches 68 of the revolving disks, whereas the opposite end of the wire will project within the path of the revolving forming block. When having reference to Figs. 15 to 18 inclusive it will be noted that upon each revolution of the forming block the pin 77 will be caused to project outwardly therefrom where it will come in contact with the free inner end of the wire and as the lug 44 is also projecting from the side of the plate 11 the pin 77 will cause the free end of the wire to be bent around the lug 44 until the free end of the wire is bent back upon itself as shown in Fig. 16, then the pin 77 will be released and caused to be passed back within the forming block so that it will not come in contact with the wire until the next revolution of the forming block. As the shaft 37 is then caused to be revolved and the lug 44 carried therewith, the inner bent end of the wire A will also be caused to revolve, but the outer end of the wire is held stationary and against rotation by means of the gripping blocks 45 and 48, thereby causing the inner free end of the wire to twist itself upon the body portion of the wire as shown in Fig. 18. When this operation is completed the disk 60 at the right-hand side of the machine is caused to advance one point in the direction of the arrows as shown in Fig. 2 of the drawings, due to the pawl and ratchet construction as formerly described thereby causing the finished wire to be removed from one side of the oscillating plate. At this time the plate 11 is oscillated in an opposite direction and the disk 58 revolved at the left-hand side of the machine so as to bring a new strand of wire in position to be gripped by means of the gripping blocks 45 and 48 at the left-hand side of the machine so that this strand of wire may also be looped. From the foregoing it is obvious that the strands of wire are automatically fed to each side of the oscillating plate 11 where they are retained in position and one end of each wire is looped, and after this complete operation has been performed at each side of the plate 11 the finished product is automatically carried away from the table by means of the notched disks 58 and 60 until the wires are deposited below the machine in a suitable receptacle.

From the foregoing description taken in connection with the accompanying drawings it will be obvious to those skilled in this art that I have provided a continuously working machine by which loops may be formed quickly and in an easy manner upon the ends of wires which may be used for tying bales together; but it is of course understood that by describing this wire working machine for forming loops upon wires to be used in connection with baling purposes, the wires may be used after being looped for any other suitable purposes.

Having thus fully described my invention, what I claim as new and desire to secure by Letters Patent is:

1. A wire looping machine comprising a support, an oscillating plate mounted thereupon, a feeding mechanism arranged adjacent to said oscillating plate, means adapted to coöperate with said oscillating plate for gripping the wires, means for intermittently bringing the gripping mechanisms into operative contact with the oscillating plate, and means for forming loops upon the ends of the wires while the same are being held by the said gripping mechanisms.

2. A wire looping machine comprising an oscillating support, feeding mechanism for feeding the wires as the same are delivered from said oscillating support, gripping mechanisms, means for intermittently bringing said gripping means into operative contact with said oscillating support for holding a single wire, and looping mechanisms adapted to be brought into operation while said wires are retained by said gripping mechanisms for the purpose set forth.

3. A wire looping machine comprising a feeding mechanism and a forming mechanism, said feeding mechanism comprising a pair of spaced disks, a notched rotatable member, a swinging mounting for said disks and notched rotatable member, means for operatively connecting said disks with said notched rotatable member, means for intermittently driving said notched rotatable member, and a stopping mechanism for retaining said disks in their proper positions for the purpose set forth.

4. A wire looping machine comprising a feeding mechanism, a forming mechanism, and a gripping mechanism, said gripping mechanism comprising two gripping jaws, means for pivotally mounting one of said jaws, a slidable support for the other said jaw, and means for intermittently bringing said jaws into operative engagement for the purpose set forth.

5. A wire looping machine comprising a horizontally arranged plate, means for oscillating said plate, a gripping mechanism, means for reciprocating said gripping mechanism whereby it will be brought into operative engagement with said plate at intervals, a feeding mechanism arranged at one side of said gripping mechanism, and a forming mechanism arranged at the opposite side of said gripping mechanism.

6. In a wire looping machine, the combination of a support, a rockable plate arranged upon said support, means for rocking said plate, a feeding mechanism arranged upon said support and in front of said rockable plate, a gripping mechanism arranged at one side of said plate, a forming mechanism arranged adjacent to said gripping mechanism, a twisting mechanism arranged upon said plate, and means whereby upon the rocking of said plate the gripping mechanism and the forming mechanism will be operated for the purpose forth.

7. A wire looping machine comprising a support, a driven shaft journaled upon said support, a plate pivotally mounted upon said support and operatively connected to said driven shaft, means whereby upon the rotation of said driven shaft said plate will be caused to oscillate, a feeding mechanism, means operatively connecting said feeding mechanism with said driven shaft whereby the same will be intermittently operated, a looping mechanims, means for operatively connecting said looping mechanism with said shaft, a twisting mechanism carried by said plate, and means for operatively connecting said driven shaft with said twisting mechanism when the plate has been oscillated, substantially as and for the purpose set forth.

8. A wire looping machine comprising a support, a driven shaft journaled upon said support, an oscillating plate arranged upon said support and operatively connected to said driven shaft whereby upon the rotation of said shaft the said plate will be caused to oscillate, feeding mechanisms supported upon said support and one arranged at each side of said oscillating plate, means for operatively connecting each of said feeding mechanisms with said driven shaft, gripping mechanisms one arranged at each side of said oscillating plate, means whereby upon the moving of said plate the said gripping mechanisms will be brought into operation, looping mechanisms one at each side of said oscillating plate, means for operatively connecting said looping mechanisms with said driven shaft, twisting mechanisms one arranged upon and at each side of said oscillating plate, said twisting mechanisms each comprising a rotatable shaft, a gear arranged upon each of said shafts, a driving gear operatively connected with said driven shaft, means whereby upon the oscillation of said plate said gears carried by said shafts of the twisting mechanisms will be intermittently brought into operative engagement with said driving gear, and means carried by said support for preventing said gears from rotating when out of operative engagement with said driving gear, substantially as and for the purpose specified.

9. A wire looping machine comprising a support, a horizontally arranged plate pivotally mounted upon said support, a driving shaft journaled upon said support and operatively connected to said plate whereby it will be caused to oscillate upon its pivoted connection, gripping mechanisms adapted to coöperate with said plate, looping mechanisms arranged at each side of said plate, twisting mechanisms, said twisting mechanisms each comprising a shaft journaled upon said plate, a gear carried by each of said shafts, means for bringing said gears into operative engagement with said driven shaft when said plate is swung upon its pivoted connection, a flange carried by each of said gears and each having a recess therein, and pins rigidly mounted upon said support and adapted to seat themselves within said recesses when said gears are out of operative engagement with said driving shaft for holding the shafts of the twisting mechanisms against rotation, substantially as described.

In witness whereof I have hereunto set my hand.

THOMAS FREDERICK MILLER.